United States Patent Office 2,992,949
Patented July 18, 1961

2,992,949
FLUX AGENTS FOR SOFT SOLDERS
Horst Melchiors, Chemotechniker Wesseling, and Wolf-Dieter Luz, Frankfurt am Main, Germany, assignors to Kuppers Metallwerk G.m.b.H., Bonn (Rhine), Germany, a corporation of Germany
No Drawing. Filed May 12, 1959, Ser. No. 812,580
Claims priority, application Germany May 14, 1958
6 Claims. (Cl. 148—23)

This invention relates to soldering fluxes, and in particular to a fluxing agent efficient in joining together any metals which may ordinarily be soldered and which may be used with a large variety of solder compositions.

An ideal soldering flux should be fast and efficient as a fluxing agent on a wide variety of metals and the residue of such ideal flux after soldering should not be corrosive, electrically conductive, hygroscopic, unsightly or harmful to the operator. In actual practice it has been found impossible to obtain a flux possessing all of these properties but the present invention relates to a flux that more nearly approaches the ideal than any of the heretofore known fluxes.

Soldering fluxes at present available may be divided into two classes; namely those which are water soluble as, for example, the inorganic halide fluxes and those which are water insoluble as, for example, the rosin fluxes. The water soluble flux is generally a mineral acid such as hydrochloric acid or phosphoric acid or salts of an acid nature ionizable to form an acid upon hydrolysis. This type of flux is very active, is corrosive at ordinary temperatures, and is generally injurious to the human skin or the vapors arising therefrom are irritating or poisonous. Any residue remaining after the soldering operation has been completed must be carefully removed to prevent corrosion. Fluxes of the water insoluble type or rosin flux, however, are generally non-corrosive at ordinary temperatures so that any residue left on the metallic parts causes no damage. These fluxes are not entirely satisfactory in certain cases because the weak acids which comprise the active ingredients are not sufficiently quick-acting nor do they clean the parts to be soldered as thoroughly as do the water soluble fluxes.

The water-insoluble fluxes generally consist of a carrier component and an activating agent. As the carrier, there is employed a resin or wax, colophony being preferably used. As the activating agent there is suitable a material which, on the one hand, exerts a corrosive action on the metal surface and, on the other hand, under the heat of the soldering operation itself, the flux residue is decomposed, volatilized, carbonized, or otherwise converted into volatile material so that no unused residue may be left to corrode the metal or promote electrical leakage, harm operators, or leave an unsightly appearance. Numerous activating agents have been suggested, as, for example, hydrohalic acid salts of various organic amines. The salts of aliphatic, primary or secondary amines having a low number of carbon atoms have proved unsuitable because of their strongly hygroscopic characteristics. Solder which contains the same in the flux agent as activators, splatter during the soldering operation and after the soldering there appears, very shortly thereafter, considerable damage due to corrosion of the base metal.

The higher aliphatic amines may be used as activating agents, however, in the soldering the decomposition releasing the hydrohalic acid proceeds only so slowly and at such high temperatures that the resin particles start to disintegrate before the same has taken place. This results in an incomplete coating and furthermore, the smell of such compounds is so disagreeable that for this reason alone their use is out of the question.

It has also been suggested to employ as activating agents quaternary ammonium compounds. However, the quaternary ammonium compounds are not sufficiently quick acting. Additionally, the salts of aromatic amines have been used as activators, but they are only insufficiently miscible with the colophony, start to decompose when admixed with the rosin and at the introduction of the fluxing agent into the solder and are generally disagreeable to handle. This is particularly true in the case of toluidine and aniline.

The principal object of this invention is to provide a fluxing agent which is non-corrosive at ordinary temperatures and which is very active at soldering temperatures. Other objects are to provide a flux of the water insoluble type which is effective in the soldering of metals that do not readily respond to this type of flux, such as nickel, zinc, copper, iron and steel; to provide a flux which will form a non-corrosive protective coating on the soldered joint after the soldering operation has been completed; to provide a flux which is not injurious to the human skin or the vapors arising therefrom are not irritating or poisonous when taken into the human body; to provide a flux, the residue of which is not electrically conducting, thus aiding and promoting electrical leakage, and to provide a fluxing agent which is readily adaptable to convenient use in a variety of soldering processes.

In accordance with the invention, there has been discovered a new type of fluxing agent having especially desirable properties, whose activity at soldering temperatures is comparable to that of water soluble fluxes, but which is non-corrosive at ordinary temperatures either before or after the soldering operation and which has no deleterious effect on the skin. This fluxing agent may be prepared by employing in combination with a carrier such as a resin or wax as the activating agent an hydrohalogenic acid salt of an N,N-disubstituted alkanolamine.

Particularly suitable N,N-disubstituted alkanolamines are those in which the substituents on the nitrogen atom contain from 1 to 6 carbon atoms. Examples of suitable N,N-disubstituted alkanolamines are dimethylethanolamine, diethylethanolamine, dibutylethanolamine, dimethylisopropanolamine, dimethylbutanolamine, phenylethylethanolamine, diphenylethanolamine etc.

The salts of N,N-disubstituted alkanolamine activators are clearly or colloidally soluble in the molten carrier substances. Sedimentation or disintegration does not even occur when the flux agent remains molten over a long period of time. When the flux agent in accordance with the invention is introduced into the solder, the same exhibits such a high order of stability and that for a long period of time even at temperatures of 130–150° C. that not even the color of the resin is changed. The hitherto known activators always are partially decomposed or volatilized at these temperatures. The unusual stability assures a uniform content of the activator in the flux agent.

The salts of N,N-disubstituted alkanolamines serving as activators in the solder materials in accordance with the invention do not show any hygroscopic properties and do not give off any disagreeable odors in the soldering operation. They reach at the soldering temperature of 300–360° C. the maximum of effectiveness and are equally well suited for all of the usual base metals. They are decomposed, volatilized, carbonized or otherwise converted into volatile material so that no unused residue remains to leave an unsightly appearance.

The flux agents in accordance with the invention may be utilized in all known types of solder. They may be used in connection with hollow or cored wire solder, or they may be used with the metal dust as a powder or in pastes, or they may be used in liquid form.

Thus by proper selection of ingredients, the flux may also take the form of a lacquer-like liquid to be painted on the parts or coated on ribbon solder. Alcohol, acetone or benzol may be used as a solvent and a small amount of synthetic resin may be added to produce a tough film that can be soldered through by using a hot iron. After the solvent evaporates the flux forms a varnish-like coating. Powdered solder may be mixed with a paste flux to provide a complete soldering mixture. The novel compositions of the invention may be adapted for convenient application in any particular soldering operation by properly choosing solvents and carriers whether the soldering is done by hand or by means of a soldering machine.

Table 1 shows the results of test solderings in which there were employed activators, in accordance with the invention, i.e., the hydrochloric acid salts of N,N-dimethylisopropanolamine and N,N-diethylethanolamine, as compared with the use of anilinehydrochloride.

TABLE 3

*Clorine losses in dependence on time-temperature 120°*

| °C. | Time, hours | Dimethyl-isopropanol-amine Cl-content.HCl, percent | Diethyl-ethanol-amine Cl-content.HCl, percent | Anilinehy-drochloride Cl-content, percent |
|---|---|---|---|---|
| 20 | 0 | 2.00 | 2.00 | 2.00 |
| 120 | 0.5 | 1.98 | 1.88 | 1.92 |
| 120 | 1.0 | 1.99 | 1.83 | 1.87 |
| 120 | 1.5 | 2.03 | 1.85 | 1.72 |
| 120 | 2.0 | 1.96 | 1.80 | 1.53 |
| 120 | 2.5 | 1.70 | 1.83 | 1.45 |
| 120 | 3.0 | 1.56 | 1.97 | 1.34 |
| 120 | 3.5 | | | 1.15 |

It will be seen that by means of the present invention, there have been provided novel soldering flux compositions having properties superior to those heretofore available and which may be economically and easily prepared and used. A flux prepared in accordance with the invention is quick acting at soldering temperatures and non-corrosive at ordinary temperatures.

TABLE 1

| Base metal | Activator | Spread in mm.² —Time in seconds | | | | | | | |
|---|---|---|---|---|---|---|---|---|---|
| | | 300° | Time | 320° | Time | 340° | Time | 360° | Time |
| Brass 63, 0.1 mm | Dimethylisopropanolamine.HCl | 93.13 | 5.5 | 92.64 | 4.0 | 85.06 | 3.9 | 84.68 | 3.4 |
| | Diethylethanolamine.HCl | 170.58 | 4.8 | 148.82 | 4.0 | 145.42 | 3.9 | 133.50 | 2.8 |
| | Anilinhydrochloride | 100.18 | 6.3 | 95.00 | 5.4 | 83.54 | 4.0 | 73.26 | 2.8 |
| Copper, 0.1 mm | Dimethylisopropanolamine.HCl | 77.7 | 6.4 | 88.28 | 5.8 | 93.92 | 5.6 | 90.14 | 2.9 |
| | Diethylethanolamine.HCl | 136.82 | 6.1 | 130.96 | 3.7 | 120.0 | 3.3 | 106.0 | 2.9 |
| | Anilinhydrochloride | 112.53 | 5.9 | 102.92 | 5.5 | 126.66 | 4.5 | 85.73 | 4.4 |
| Nickel, 0.3 mm | Dimethylisopropanolamine.HCl | 64.80 | 6.2 | 68.52 | 6.1 | 69.84 | 4.9 | 76.00 | 5.3 |
| | Diethylethanolamine.HCl | 151.13 | 6.3 | 149.23 | 5.8 | 133.86 | 4.1 | 132.60 | 4.3 |
| | Anilinhydrochloride | 72.66 | 7.7 | 80.93 | 6.6 | 77.06 | 5.8 | 78.20 | 5.6 |
| Zinc, 0.2 mm | Dimethylisopropanolamine.HCl | 154.94 | 6.8 | 165.78 | 5.3 | 166.60 | 4.8 | 183.40 | 4.2 |
| | Diethylethanolamine.HCl | 171.26 | 5.2 | 178.46 | 4.4 | 182.92 | 4.2 | 216.44 | 3.3 |
| | Anilinhydrochloride | 146.70 | 5.4 | 160.33 | 4.3 | 164.76 | 3.8 | 188.76 | 3.8 |
| Cadmium, 0.2 mm | Dimethylisopropanolamine.HCl | 135.92 | 6.6 | | | | | | |
| | Diethylethanolamine.HCl | 203.24 | 4.5 | (¹) | (¹) | (¹) | (¹) | (¹) | (¹) |
| | Anilinhydrochloride | 132.04 | 7.6 | | | | | | |

¹ May only be soldered at temperatures of up to 300° C., beyond that it melts and oxidizes the cadmium coating.
Test quantity: Each 200 mg. wire 60/Cu, φ 2 mm., flux agent filling weight 2 weight percent.
Soldering arrangement: directly heated soldering bath.
Quota of activator in flux agent: a quantity equivalent to a content of 2% chlorine.

Table 2 shows the decrease in the chlorine content of the activators under the influence of heat, employing temperatures increasing at 10 minute intervals by 10° for the range between 100 and 200° C.

TABLE 2

*Chlorine losses—Increased heating*

| °C. | Time, minutes | Dimethyl-isopropanol-amine Cl-content.HCl, percent | Diethyl-ethanol-amine Cl-content.HCl, percent | Anilinehy-drochloride Cl-content, percent |
|---|---|---|---|---|
| 20 | 0 | 2.00 | 2.00 | 2.00 |
| 100 | 10 | 1.94 | 1.99 | 1.92 |
| 110 | 10 | 1.98 | 1.98 | 1.72 |
| 120 | 10 | 1.98 | 1.87 | 1.67 |
| 130 | 10 | 1.89 | 1.84 | 1.53 |
| 140 | 10 | 1.97 | 1.80 | 1.52 |
| 150 | 10 | 1.93 | 1.85 | 1.44 |
| 160 | 10 | 1.93 | 1.94 | 1.40 |
| 170 | 10 | 1.93 | 1.87 | 1.34 |
| 180 | 10 | 1.87 | 1.93 | 1.15 |
| 190 | 10 | 1.87 | 1.93 | 0.96 |
| 200 | 10 | 1.83 | 1.90 | 0.96 |
| Total | 110 | (¹) | (¹) | (²) |

¹ Test substances are clearly dissolved and solderable.
² Sublimates strongly, darkens markedly, black streaks form from 170° C. on.

Table 3 shows the decrease in the chlorine content over long-continued heating at 120° C.

Since a number of changes may be made in the above mentioned products and different embodiments of the invention may be made without departing from the scope of the invention, it is intended that all matters contained in the above description and specific examples should be interpreted as illustrative and not in a limited sense.

We claim:
1. In a soldering flux for soft solder having an activating agent and a carrier selected from the group consisting of resins and waxes, the improvement which comprises the activating agent essentially consisting of a hydrohalide salt of a lower alkanolamine disubstituted at the nitrogen atom with members from the group consisting of phenyl and alkyl radicals having from 1–6 carbon atoms.

2. Improvement according to claim 1 in which said activating agent is N,N-diethylethanolamine hydrochloride.

3. Improvement according to claim 1 in which said activating agent is N,N-dimethylisopropanolamine hydrochloride.

4. In the process for soldering metals with soft solder, the improvement which comprises applying a hydrohalide salt of a lower alkanolamine disubstituted at the nitrogen atom with members selected from the group consisting of phenyl and alkyl radicals having from 1–6 carbon atoms in order to clean the metal surface and facilitate the flow of the solder thereon.

5. Improvement according to claim 4 in which said hydrohalide salt is N,N-diethylethanolamine hydrochloride.

6. Improvement according to claim 4 in which said hydrohalide salt is N,N-dimethylisopropanolamine hydrochloride.

References Cited in the file of this patent

UNITED STATES PATENTS

| | | |
|---|---|---|
| 2,330,904 | Miller | Oct. 5, 1943 |
| 2,612,459 | Willard et al. | Sept. 30, 1952 |
| 2,690,408 | Pessel | Sept. 28, 1954 |